US009189268B2

(12) United States Patent
Rama et al.

(10) Patent No.: US 9,189,268 B2
(45) Date of Patent: Nov. 17, 2015

(54) LIMITING SIMULTANEOUS DATA TRANSFERS AND EFFICIENT THROTTLE MANAGEMENT

(75) Inventors: Harish Kumar Sampangi Rama, Bangalore (IN); Anurag Palsule, Bangalore (IN); Anil Kumar Ponnapur, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 1620 days.

(21) Appl. No.: 12/249,753

(22) Filed: Oct. 10, 2008

(65) Prior Publication Data

US 2010/0094999 A1 Apr. 15, 2010

(51) Int. Cl.
G06F 15/16 (2006.01)
G06F 9/48 (2006.01)
G06F 9/50 (2006.01)

(52) U.S. Cl.
CPC ............ *G06F 9/4843* (2013.01); *G06F 9/5011* (2013.01); *G06F 2209/504* (2013.01); *Y02B 60/142* (2013.01)

(58) Field of Classification Search
CPC .......................... G06F 9/5011; G06F 2209/504
USPC ................... 709/220–221, 223–226
See application file for complete search history.

(56) References Cited

U.S. PATENT DOCUMENTS 5,958,053 A * 9/1999 Denker ............................. 726/1
6,230,200 B1 * 5/2001 Forecast et al. ............... 709/226
7,107,344 B2 * 9/2006 Davis et al. .................... 709/227
7,140,016 B2 * 11/2006 Milovanovic et al. ........ 718/100
7,145,868 B2 * 12/2006 Giroux et al. .................. 370/229
7,437,581 B2 * 10/2008 Grochowski et al. ......... 713/320
7,796,508 B2 * 9/2010 Hariharan et al. ............. 370/229
2002/0019843 A1 * 2/2002 Killian et al. .................. 709/102
2003/0058851 A1 * 3/2003 Goldman ...................... 370/389
2003/0154272 A1 8/2003 Dillon et al.
2004/0010585 A1 1/2004 Jones et al.
2004/0225863 A1 11/2004 Yamashita
2009/0282406 A1 * 11/2009 Malki et al. ................... 718/100

FOREIGN PATENT DOCUMENTS

EP 0961204 A2 12/1999

OTHER PUBLICATIONS

International Search Report and Written Opinion PCT/2009/059853 dated May 24, 2010, pp. 1-11.

* cited by examiner

*Primary Examiner* — Minh-Chau Nguyen

(57) ABSTRACT

A network storage server implements a method to limit simultaneous data transfers and efficient throttle management. The number of processes that can be simultaneously performed in the network storage server is limited. For the processes that do not exceed the limiting number, and are therefore allowed to be simultaneously performed, a throttle control is implemented on each of the processes to limit the amount of system resources that can be allocated to each of the processes. The processes are performed on the network storage server, and a total amount of system resources allocated to these processes does not exceed the available system resources of the network storage server.

25 Claims, 5 Drawing Sheets

LIMITING SIMULTANEOUS DATA TRANSFERS AND EFFICIENT THROTTLE MANAGEMENT

FIELD OF THE INVENTION

At least one embodiment of the present invention pertains to network storage systems, and more particularly, to limiting simultaneous data transfers and efficient throttle management in a network storage system.

BACKGROUND

A storage server is a computer system that is used to store and retrieve data on behalf of one or more clients on a network. A storage server typically stores and manages data in a set of mass storage devices, such as magnetic or optical storage-based disks or tapes. In conventional network storage systems, the mass storage devices may be organized into one or more groups of drives (e.g., redundant array of inexpensive drives (RAID)).

A storage server may be configured to service file-level requests from clients, as in the case of file servers used in a Network Attached Storage (NAS) environment. Alternatively, a storage server may be configured to service block-level requests from clients, as done by storage servers used in a Storage Area Network (SAN) environment. Further, some storage servers are capable of servicing both file-level and block-level requests, as done by certain storage servers made by NetApp®, Inc. of Sunnyvale, Calif.

Conventionally, a storage server equally divides its available system resources, e.g., CPU, memory, etc, among processes serving inbound and outbound data requests. For example, assuming a storage server has 1000 kbps (Kilobit per second) throughput available for network communications, if there are 10 simultaneous processes transferring data in or out of the storage server via the network, the storage server may allocate 100 kbps of network bandwidths to each process. When there are 100 simultaneous data transferring processes, then each process can be allocated with 10 kbps of the network bandwidth, which probably would be considered insufficient for network communications. Further, the more simultaneous processes there are, the more task switching the storage server has to perform, which further lowers the performance of the storage server. Thus, when there is no limitation on the number of simultaneous processes that are allowed to run on a storage server, resource bottlenecks tend to occur.

For data protection purposes, data stored in a primary storage server is often backed-up or mirrored to one or more remote secondary storage servers. The replicated data in the secondary storage servers can later be used for restoring data on the primary storage server, if needed. Since these backup and mirroring processes transfer a large amount of data across a network, they typically require a large amount of system resources, and run for a long period of time. However, in a typical system resource arrangement, these data protection processes are not treated any differently from the other processes. Consequentially, a limited number of simultaneous running data protection processes can occupy most, if not all, of the system resources, leaving little to the storage server for serving other data requests. Thus, without limiting allocation of system resource to some of the resource-thirsty processes, resource bottlenecks can become major performance concerns.

Once a system resource becomes bottlenecked, it takes longer for each of the simultaneous running processes that require the resource, especially the ones that are resource-hungry and long durational, to finish using the resource. To further complicate matters, if a backup or mirroring process fails pre-maturely because it cannot finish quickly enough, any data that has already been transferred to the secondary storage servers may no longer be trustworthy, and may be unusable for recovery purposes. Thus, when there is no restriction as to the number of simultaneous processes and to the amount of system resources that can be allocated to each process, a disaster could have a bigger impact on the data reliability provided by the storage servers than there otherwise would be. If the replicated data is corrupted due to lack of resources, the system resources previously allocated for transferring the data have also been wasted.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
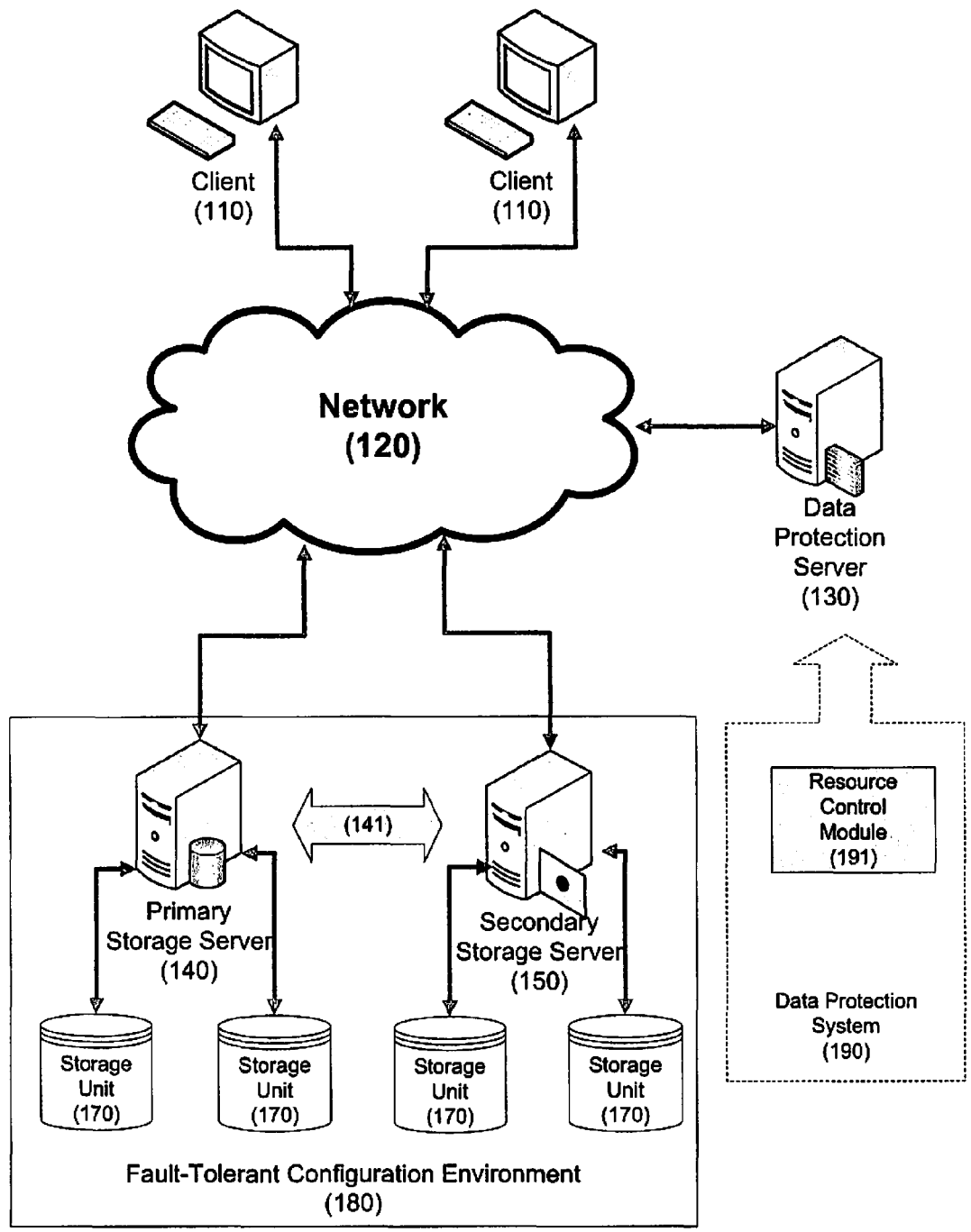
FIG. 1 illustrates a network storage environment in which the present invention can be implemented.

A method and apparatus for limiting simultaneous data transfers and efficient throttle management are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

For a storage server with limited system resources (e.g., CPU, memory, network, storage), a resource control system can be implemented to efficiently allocate the available system resources, and to minimize unnecessary resource bottlenecks or contention. According to one embodiment, the resource control system employs two systematic policies: one is to limit the number of processes that can be simultaneously executed; and the other is to limit the amount of system resources that can be allocated to each of the executing processes. Compared to a none-limiting resource allocation arrangement, limiting the number of simultaneous processes provides a bigger share of the system resources to each running process, which in turn allows each process to complete sooner. And, limiting the allocation of system resources to each process ensures that no single process can occupy more than its fair share of resources, thereby improving the overall performance of the storage server.

In a fault-tolerant storage environment, one or more storage servers can be configured as primary and secondary storage systems. Data stored in a primary storage system is frequently replicated, e.g., backed up or mirrored, etc, to secondary storage systems. In one embodiment, the primary storage system contains a hierarchy of storage entities (e.g., storage servers, volumes, qtrees, etc). Each storage entity has its own data replication policies to transfer data stored in the entity to the corresponding storage entities in the secondary storage systems. Based on these data replication policies, multiple data transferring processes may be simultaneously executed to provide real-time replications of the data stored in these storage entities. Since these data transferring processes are often resource-thirsty, as they require bandwidths from CPU, memory, network, and storage, etc, a data protection manager, which initiates these data transferring processes, can be implemented with the above resource control system to limit the number of these processes that can be run simultaneously, and to apply throttle controls to the allocation of system resources among these processes. For example, the resource control system can limit the number of backup transfers to ensure that the executing transfers can finish as soon as possible, thereby allowing the data to be properly backed up for disaster recovery. The resource control system can also limit the amount of resources allocated to some of these transfers, thereby leaving adequate resources to the other transfers or to the storage server, resulting in efficient distribution of system resources.

The limitation on the number of simultaneous processes can be implemented with a fixed number of streams. A stream is a process that is authorized by the resource control system to perform specific actions. For example, if a resource control is required to manage network bandwidth, then a specified number of streams for data transfers can be configured. Once these streams are initiated, any process intended to transfer data via a network is required to use one of these streams for its data transferring needs. During normal operation, if there are streams available, a data transferring process obtains one of the available streams before starting its transfer. When the process completes, the stream it occupied becomes available for additional processes.

When there are no streams available, additional processes that are simultaneously initiated are suspended, until some of the active processes complete their processing, and the streams and system resources become available again. Based on the newly ascertained system resources, a controlled number of suspended processes are activated, and the newly ascertained system resources are distributed among the newly activated processes. Thus, the resource control system efficiently manages resources by limiting the number of processes, thereby ensuring that no unnecessary processes can be started to compete for the limited system resources.

In one embodiment, the resource control system implements resource throttles on the executing processes. When the streams are initiated, each can be assigned with a fixed amount of limited system resources, and a total amount of resources assigned to all streams cannot exceed the total available system resources. During processing, the streams are either prevented by the resource control system from allocating additional resources, or the streams monitor and enforce these resource limitations by themselves. When some of the streams complete their assigned tasks, their assigned resources can be released and redistributed according to the current load on a storage server. Thus, when a storage server's load decreases, newer transfer processes may receive a bigger share of system resources. Thus, the resource control system dynamically allocates system resources according to resource availability as well as requested needs. Such approach improves the utilization of system resources, while helping to ensure that no unnecessary bottleneck will occur.

In one embodiment, the resource control system can be implemented on the primary storage system, the secondary storage system, or both. It can also be customized or dynamically configured according to different applications' needs.

Further, the resource control system can be implemented to reduce potential bottlenecks in any other kinds of system resources, in addition to network bandwidths. By integrating this system with different applications, resource control can be scheduled, tailored to specific users or applications, and even distributed to external systems.

Refer now to FIG. 1, which shows a network storage environment in which the present invention can be implemented. In FIG. 1, storage servers 140 and 150 manage multiple storage units 170 that include non-volatile mass storage devices (not shown). These storage servers provide storage services to a set of clients 110 through a network 120. The network 120 may be, for example, a local area network (LAN), wide area network (WAN), metropolitan area network (MAN), global area network such as the Internet, a Fibre Channel fabric, or any combination of such interconnects. Each of the clients 110 may be, for example, a conventional personal computer (PC), server-class computer, workstation, handheld computing or communication device, or the like.

Storage of data in the storage units 170 is managed by the storage servers 140 and 150. The storage servers 140 and 150 receive and respond to various read and write requests directed to data stored in or to be stored in the storage units 170. The storage units 170 can include, for example, conventional magnetic or optical disks or tape drives; alternatively, they can include non-volatile solid-state memory, such as flash memory. The mass storage devices in storage units 170 can be organized as a Redundant Array of Inexpensive Disks/Devices (RAID), in which case the storage servers 140 and 150 access the storage units 170 using one or more well-known RAID protocols.

The storage server 140 or 150 can be a file-level storage server such as used in a NAS environment, a block-level storage server such as used in a SAN environment, or a storage server which is capable of providing both file-level and block-level service. Further, although each of the storage servers 140 and 150 is illustrated as a single unit in FIG. 1, it can have a distributed architecture. For example, the storage server 140 or 150 can include a physically separate network module (e.g., "N-module") and disk module (e.g., "D-module") (not shown), which communicate with each other over an external interconnect. The N-module acts as a front-end of the storage server, exporting services to clients; and the D-module acts as the back-end, managing the underlying storage of the storage server. The N-module and D-module can be contained in separate housings and communicate with each other via network connections. Thus, the N-module and the D-module enable a storage server to be physically separated into multiple modules that can be distributed across a network.

In FIG. 1, a fault-tolerant configuration is implemented in a fault-tolerant configuration environment 180 to ensure that data remains available to clients 110 even in disastrous situations. The fault-tolerant configuration is established by replicating data between the two storage servers 140 and 150, thereby reducing the risk of data loss due to the failure of a single storage server. During normal operations, the storage server 140 functions as a primary storage server in providing data services to clients 110. The storage server 150 takes on a secondary, standby role, only to replicate data stored and/or updated in the primary storage server 140. A set of data transferring processes 141 can be executing in either the primary storage server 140, the secondary storage server 150, or both, to transfer data between these two servers. Thus, data transferring processes 141 backup or mirror data from server 140 to server 150, or restore the backed up data from server 150 to server 140. The primary and secondary roles can be switched between the servers 140 and 150.

In one embodiment, a data protection server 130 is connected to the network 120. The data protection server 130 contains a data protection system 190, which manages the fault-tolerant configuration in the environment 180. Typical data protection tasks controlled by the data protection system 190 include: configuring the data transferring processes 141; scheduling the execution of these data transferring processes 141; overseeing the executing processes; and/or organizing the backed-up data, etc. In one embodiment, the data protection system 190 not only can manage the data transferring processes 141 between the storage servers 140 and 150, but also can control similar backup and restoring of data between clients 110 and the storage servers 140 and/or 150. Thus, in addition to being in a data protection server 130, the data protection system 190 can also be installed on storage servers 140 and 150, and/or on clients 110 for managing data replications among these entities.

In one embodiment, the data protection system 190 includes a resource control module 191. The resource control module 191 manages the processes and system resources on one or more computer systems. When integrated with the data protection system 190, the resource control module 191 can limit the number of simultaneous processes running within the fault-tolerant configuration environment 180, and control the system resources consumed by these processes. In the fault-tolerant configuration environment 180, the systems that can be managed by the resource control module 191 include the storage servers 140 and 150, clients 110, and/or any ancillary devices not shown in FIG. 1. The resource control module 191 can separately manage resources utilized by each of the storage servers 140, 150, and clients 110. The resource control module 191 can also manage the fault-tolerant configuration environment 180 as a whole. Similar to the data protection system 190, the resource control module 191 can stand by its own on any system with access to the environment 180, or can be implemented on the storage servers 140 and 150, and/or clients 110, etc. In addition, other inbound or outbound data movements, originated from or intended for the fault-tolerant configuration environment 180, can also be similarly monitored or controlled.

In one embodiment, available system resources in a fault-tolerant configuration environment 180 can be reasonably ascertained based on the hardware installed in the configuration 180, and/or the software configured for the allocation and utilization of these hardware components. Hardware sources include hardware configurations such as the number of CPUs, speed of the CPUs, memory capacities, internal or external storage capacities, storage throughputs, network configurations, network throughputs, etc. System resources can also be affected by software configurations. For example, the amount of memory can often be increased by an operating system with the addition of virtual memory.

In one embodiment, the amount of system resources, such as memory usage, CPU utilization, etc, can be manually recorded and evaluated by a system administrator. Alternatively, resource usage and availability can be measured by network tools. For example, network resources in the environment 180 and the network 120 can be determined based on network benchmarking tools. Storage resources in the storage servers 140 and 150 can be ascertained from the available free space. CPU throughput provided by the storage servers 140 and 150 can be evaluated by CPU performance testers.

In one embodiment, existing or potential bottlenecks can be ascertained or predicted based on long term monitoring of a system's operation. The bottlenecked resources should receive high priorities in applying resource control, thereby reducing the possibility of such resource contentions. During run time, system resource utilization can be monitored and recorded for the purpose of eliminating of bottlenecks. For example, if memory usage is one of the bottlenecks in a system environment, the resource control module 191 can be designed and developed in the environment to ease this memory bottleneck by utilizing the similar approaches as described below.

In one embodiment, once a resource control policy is contemplated for the fault-tolerant configuration environment 180, any processes intended to participate in such resource control need to provide access interfaces or control logic to the resource control module 191, so that the module 191 can dynamically enable, disable, or allocate resource to, these processes. Further, the resource control module 191 can utilize the underlying operating systems running in the environment 180 to apply external controls to these processes. Thus, the resource control module 191 not only can control the number of a specific type of processes that are allowed to run simultaneously, but also can control the amount of system resources each of these processes is allowed to utilize. Thus, the resource control module 191 enables better utilization of the available system resources and reduces potential bottlenecks on some of the limited resources. The details about limiting processes and throttle management are further described below.

Figure 2:
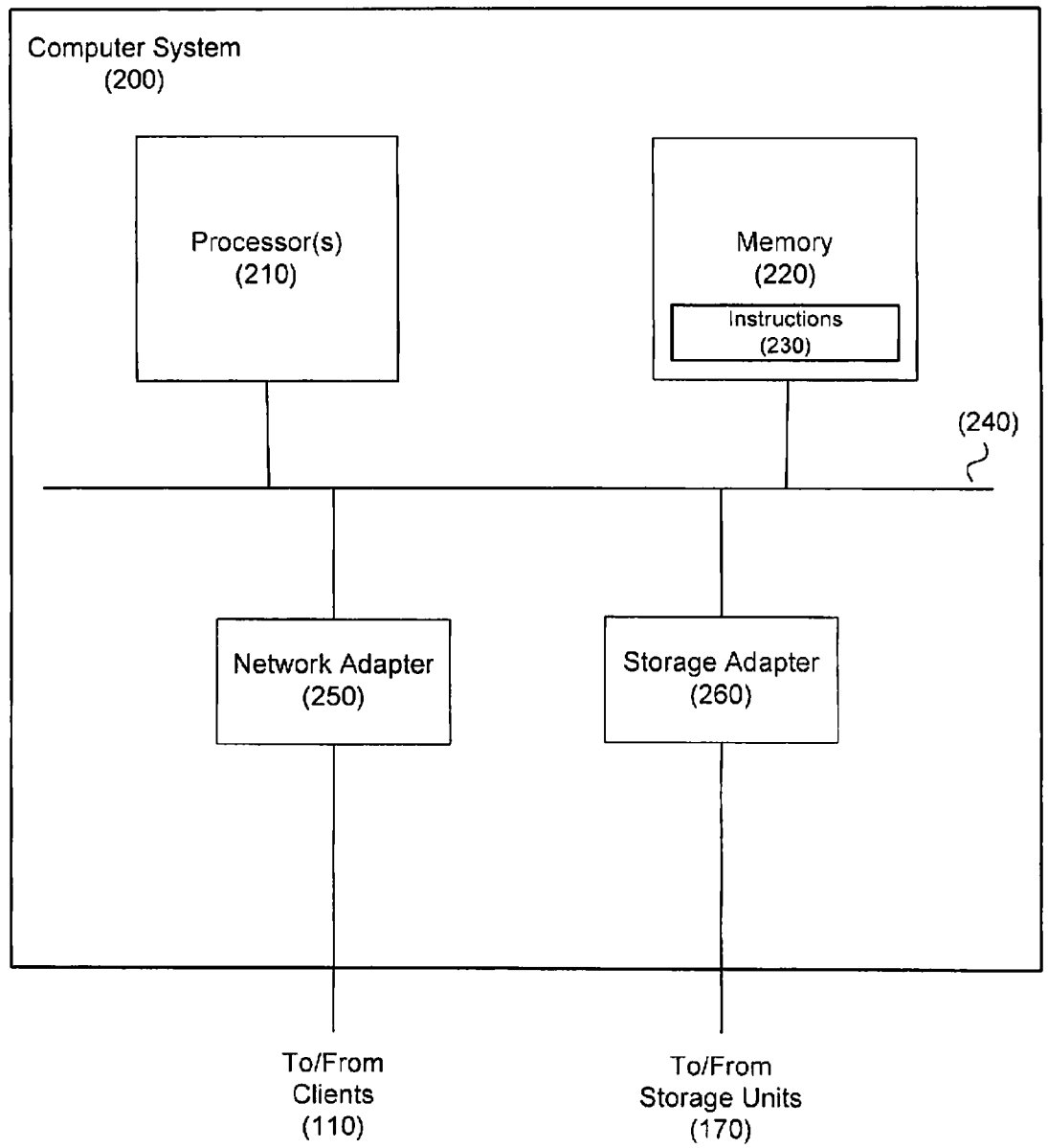
FIG. 2 is a high-level block diagram showing an example of the architecture of a computer system.

FIG. 2 is a high-level block diagram showing an example of the architecture for a computer system 200 that can be utilized to implement a primary storage server 140, a secondary storage server 150, a data protection server 130, or a client 110 of FIG. 1. In FIG. 2, the computer system 200 includes one or more processors 210 and memory 220 connected via an interconnect 240. The interconnect 240 is an abstraction that represents any one or more separate physical buses, point-to-point connections, or both connected by appropriate bridges, adapters, or controllers. The interconnect 240, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 210 may include central processing units (CPUs) of the computer system 200 and, thus, control the overall operation of the system 200. In certain embodiments, the processor(s) 210 accomplish this by executing software or firmware stored in memory 220. The processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 220 is or includes the main memory of the computer system 200. The memory 220 represents any form of random access memory (RAM), read-only memory (ROM), flash memory (as discussed above), or the like, or a combination of such devices. In use, the memory 220 may contain, among other things, a set of machine instructions 230 which, when executed by processor 210, causing the processor 210 to perform operations to implement embodiments of the present invention. In an embodiment in which a computer system 200 is implemented as a storage server, machine instructions 230 include an operating system for the storage server. When a computer system 200 is implemented as a data protection server 130, the memory 220 includes machine instructions 230 for implementing a resource control module 191 of FIG. 1.

Also connected to the processor(s) 210 through the interconnect 240 are a network adapter 250 and a storage adapter 260. The network adapter 250 provides the computer system 200 with the ability to communicate with remote devices, such as clients 110, over the network 120 of FIG. 1, and may be, for example, an Ethernet adapter or Fibre Channel adapter. When a computer system 200 is implemented as a storage server, the storage adapter 260 allows the computer system to access the storage units 170 and may be, for example, a Fibre Channel adapter or a SCSI adapter.

Figure 3:
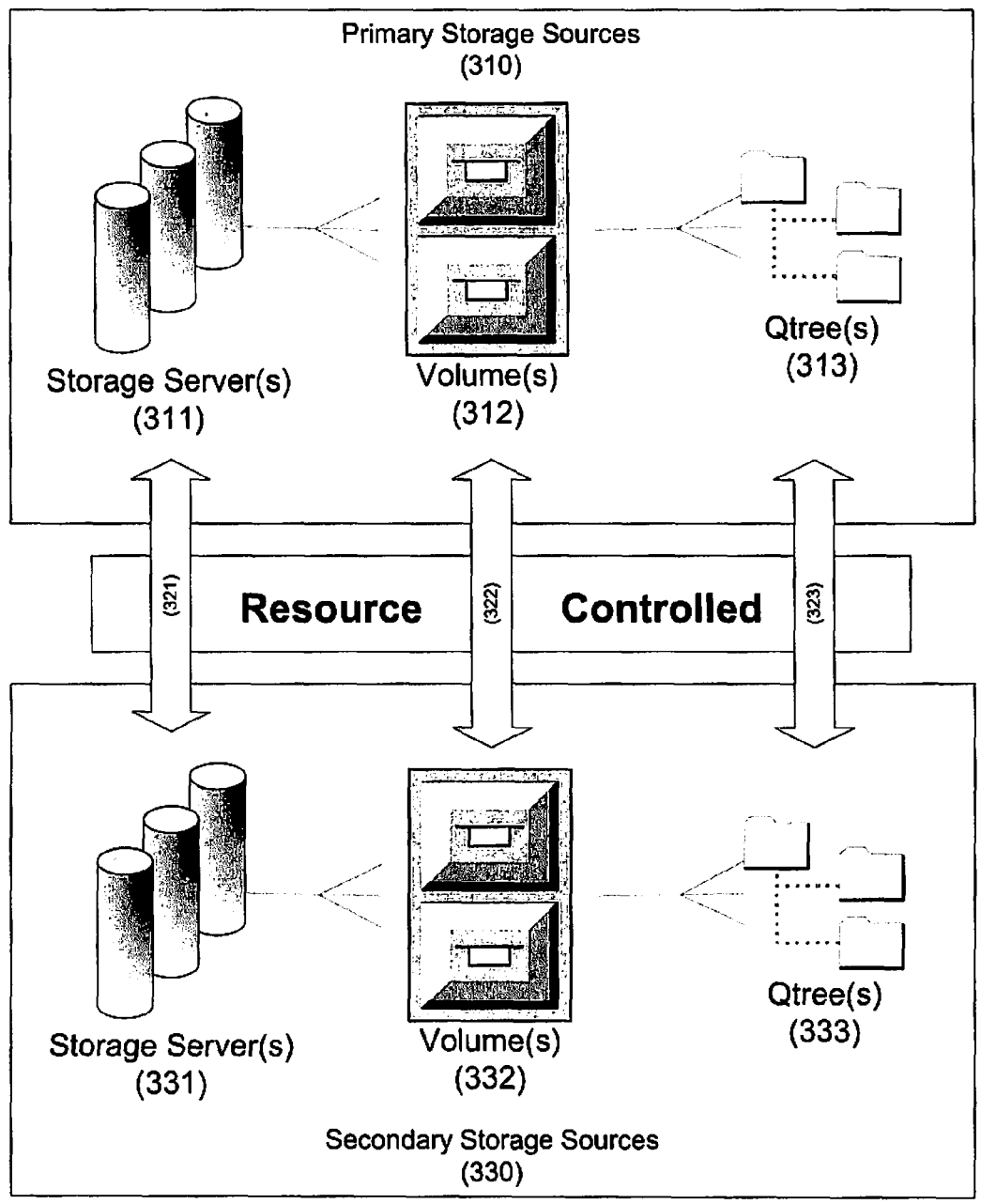
FIG. 3 illustrates various fault-tolerant policies in a fault-tolerant configuration.

FIG. 3 schematically illustrates various fault-tolerant policies in a fault-tolerant configuration, in accordance with certain embodiments of the present invention. A fault-tolerant configuration allows data from a primary data source to be replicated to a secondary data source. A data source is a logical or physical entity for the storage of data. For example, a data source can be, a data block, a disk, a Logical Unit Number (LUN), a storage volume, or a storage server, etc. It can also represent a file, a directory, a file system, or any logical or physical storage structure that can be implemented by one or more storage units or storage servers in a network storage environment.

In one embodiment, data replication for a fault-tolerant configuration can be implemented by backing up, mirroring, and/or restoring data between a primary data source and a secondary data source. The differences between backup and mirroring can be in their invocation frequency. Backup may be performed hourly, daily, weekly, or in a longer interval, while mirroring may require synchronization immediately after data is updated in the primary data source. Backup may take a copy of the entire source, while mirroring sends only the updates to the mirror destination. Further, backup can retain multiple copies of the historical data, while mirroring retains one or more real-time duplicates of the primary data source in its most up-to-date form. In comparison, restoring is the reverse of backing-up or mirroring. Thus, in order to provide real-time replication of data stored in a primary data source, a fault-tolerant configuration can employ multiple backup, mirroring, and/or restoring processes simultaneously transferring data between the primary and secondary data sources.

In FIG. 3, multiple fault-tolerant policies can be implemented between the primary storage sources 310 and the secondary storage sources 330. In one embodiment, the primary and secondary storage sources 310 and 330 contain a storage hierarchy, in which storage servers 311, volumes 312 and qtrees 313 of FIG. 3 are examples of storage entities located at different levels. A storage server 311 similar to storage servers 140 or 150 of FIG. 1 contains one or more storage volumes 312 (relationship is illustrated in FIG. 3 by a one-to-many connector). A volume 312 is a logical storage entity which can be created with multiple physical drives, optionally configured under a RAID scheme. Storage space within a volume can be further distributed to one or more qtrees 313. In addition of being a storage entity, a qtree, or quota tree, is a top-level directory in a volume that provides further configurations, such as security, space usage, and file size controls, etc. Other types of storage entities (not shown in FIG. 3), such as RAID groups, physical drives, partitions, etc, can also be configured based on storage spaces provided by a storage server, or multiple storage servers 311.

In one embodiment, the secondary storage sources 330 replicate the data stored in the different hierarchical entities of the primary storage sources 310. Different types of data replication relationships can be configured between these two storage sources 310 and 330 to provide multiple levels of data protection. Similar to the primary storage sources 310, the secondary storage sources 330 can be configured with a set of storage servers 331, each of which contains one or more volumes 332, and each of which contains one or more qtrees 333. The storage servers 331, volumes 332 and qtrees 333 correspond to the storage entities in the primary storage sources 310. Alternatively, the configuration in the secondary storage sources 330 does not need to match the primary storage sources 310. For example, multiple storage servers 331 can be configured to replicate data from a single storage server 311; or a storage server 331 can contain different number of volume 332 in comparison to a storage server 311 with its embedded volumes 312. Based on these different types of storage entities, different processes can be initiated to provide granulated levels of data replication.

In one embodiment, one or more data transferring processes 321 are designed to perform data replication between storage servers 311 and storage servers 331. Similarly, one or more data transferring processes 322 replicate data between volumes 312 and volumes 332; and one or more data transferring processes 323 replicate data between qtrees 313 and 333. Data transferring processes can also exist between other types of storage entities in the two storage sources 310 and 330. Data transferring processes 321, 322 and 323 can be scheduled to run based on certain data replication policies; they can also be initiated, separately or simultaneously, by a data protection system 130 of FIG. 1. Because a large amount of data can be involved during the transfer, processes 321-323 are suitable candidates for limiting simultaneous transfers and throttle control. By limiting the number of processes 321-323 being simultaneously performed, the storage sources 310 and 330 would not be threatened by an unlimited number of simultaneously running big tasks clogging up system resources. Also, by enacting throttle control on these processes 321-323, the storage sources 310 and 330 can be certain that adequate system resources are always available for processing other external data requests.

In one embodiment, each of the processes 321-323 can be treated equally in process limiting and throttle control. Thus, a process 323 (replicating data from a qtree 313 to a qtree 333), which is a relatively small task in comparison to a process 321 (replicating data from a storage server 311 to a storage server 331), can have an equal chance in resource allocations. Alternatively, a priority scheduling can be implemented by assigning a priority to each of the processes 321-323. Thus, when simultaneous processes are limited in number, a process with a high priority can be selected first for processing, can be activated quicker from suspension, and/or can receive a bigger share of system resources. Such approach is advantageous since smaller tasks, if having a high priority, can be quickly launched and completed, thereby reducing the number of pending processes and improving the overall performance of the storage sources 310 and 330.

Figure 4:
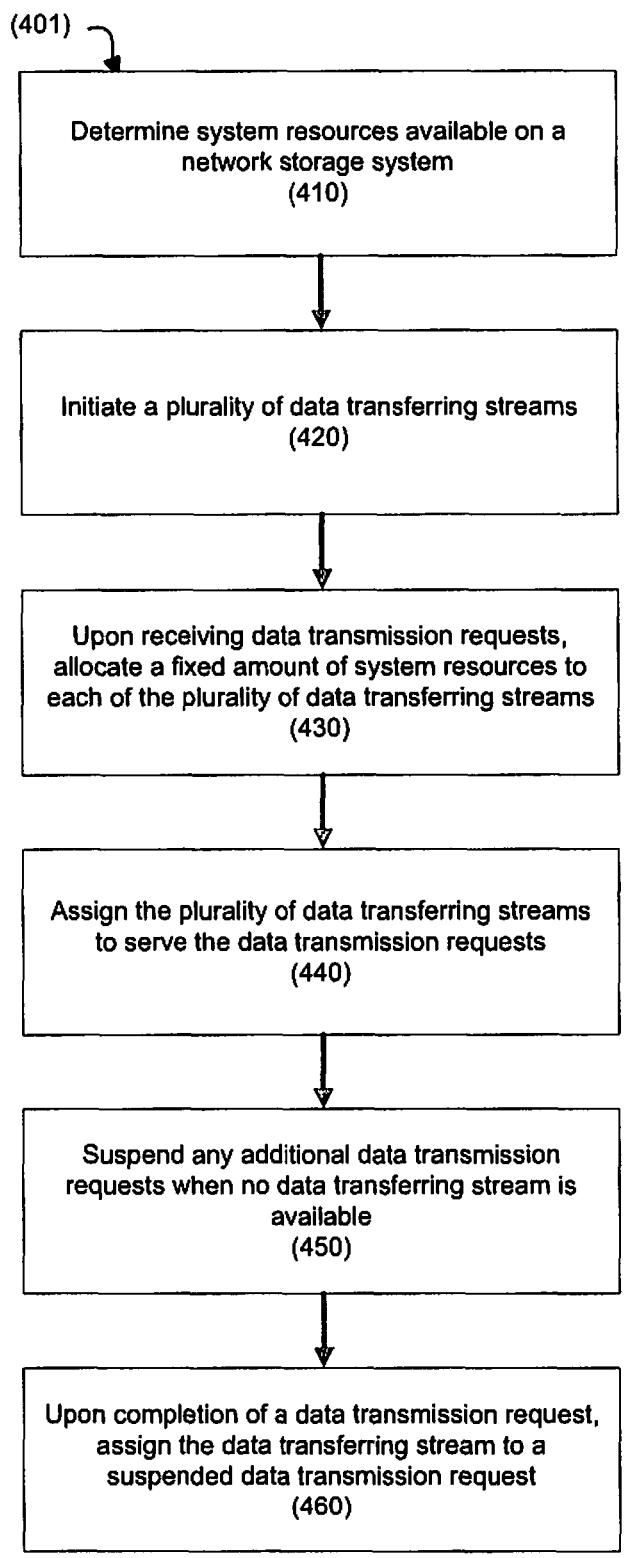
FIG. 4 illustrates a process for limiting simultaneous data transfers and throttle control.

FIG. 4 illustrates a process 401 for limiting simultaneous data transfers and throttle control, according to certain embodiments of the present invention. The process 401 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 401 can be stored in memory 220 of FIG. 2, executed by the processor 210 of FIG. 2. For example, process 401 can be performed by a data protection server 130 of FIG. 1.

In one embodiment, the process 401 can operate logically between a file system manager and a storage driver layer in the storage servers 140 and 150 of FIG. 1. The file system maintains storage hierarchies, manages consistent points, and executes read and write operations on the mass storage units in response to client requests. The storage driver layer include a network access layer implementing various protocols (NFS, CIFS, HTTP, etc) used to communicate with client devices, and a storage access layer implementing storage protocols such as RAID, Fibre Channel, SCSI, etc. Thus, process 401 is able to have access to client requests, and well as to network, storage and other system resources.

In one embodiment, process 401 is based on an identification of network throughput as a limited system resource suitable for process-limiting and throttle-control. Alternatively, process 401 can be equally adapted to manage the optimal allocation of other types of system resources, such as memory, CPU, internal or external storage, etc to the processes. At 410, a network storage system is under the management of a resource control system, and the available system resources on the network storage system are ascertained. In this case, system resources that are related to network throughput can be quantified. For example, based on network configurations and network capacities, etc, after taking into consideration the required network bandwidths for other data services and user request processing, a fixed amount of network throughput is allocated for the data transferring processes among a primary storage server, a secondary storage server, and/or clients. The fixed amount of network throughput is deemed sufficient for a limited number of simultaneous data transferring processes without causing network bottlenecks to the storage servers and the surrounding network environment.

In one embodiment, a stream is a process that is authorized by a resource control system to perform specific actions. In this case, a stream is a process for data transferring in or out of the network storage system. At 420, based on the system resources calculated at 410, a fixed number of data transferring processes (streams) is pre-determined, and optionally, initialized to handle any data transferring needs. The fixed number indicates the maximum number of transfers that can be simultaneously performed, and therefore would be allocated with system resources in the network storage system. For example, when a conventional fault-tolerant configuration has an average of eight (8) and a maximum of twenty (20) data replication processes simultaneously running, a resource control system could determine that ten (10) data transferring streams are adequate for serving these processes without causing unnecessary network bottlenecks. The pre-determined or fixed number can be ascertained prior to, or during the execution of the streams by a resource control module.

In one embodiment, a stream can be specifically designed for resource control during data transferring. For example, a stream can utilize a special form of network driver or socket provided by the resource control system. Thus, a stream can utilize standard network programming interfaces in creating, connecting, binding, listening, accepting, transmitting, and/or terminating data transmission via the special stream driver or socket. By controlling the driver or socket, a resource control system can easily limit, suspend, or activate a stream or any process utilizing the stream for data transferring. Alternatively, a data transfer process without utilizing special network driver can still participate or be instructed in process-limiting and throttle control, even though it cannot be directly controlled by a resource control system. In this case, the data transferring process can either actively restrict its own resource allocation under the guidance of the resource control system, or provide interfaces to the resource control system for configuration.

In one embodiment, a fixed number of streams are initialized and ready for data transfer. And any data replication tasks that are under the management of the resource control system can only utilize these pre-initialized streams for their transferring needs. Each stream can be repeatedly utilized for transferring data between two different entities. For example, a stream can be used for data transferring between a primary storage server and a secondary storage server one time, and from a client to a primary storage server the next time, etc. Alternatively, the fixed number of streams can be initialized according to run-time demands, as long as the total number of active streams does not exceed the pre-defined maximum number. Thus, if there are fewer transferring requests than the fixed number of streams, the resource control system can initialize a smaller number of streams equal to the number of transferring requests. Such approach is advantageous since an unnecessary initialized stream also wastes some system resources.

At 430, upon receiving a number of data transferring requests, a fixed amount of system resources (throttle) is allocated to each of the streams initiated at 420. The throttle is the maximum amount of resources that can be used by a stream, and the total amount of system resources from all of the streams, including initialized and non-initialized, cannot exceed the total amount of available system resources ascertained at 410. For example, assume that a calculation at 410 determines the total network throughout available for data replication in a fault-tolerant configuration is 1000 kbps (Kilobit per second). If the fixed number of simultaneous data transferring streams determined at 420 is ten (10), then each of the ten streams can be allocated with a fixed 100 kbps of network throughout. Thus, when all ten (10) of the streams are simultaneously running, the total network throughout for the storage system would be 1000 kbps, which is exactly the same as the predetermined available network resources in the fault-tolerant configuration.

Figure 5:
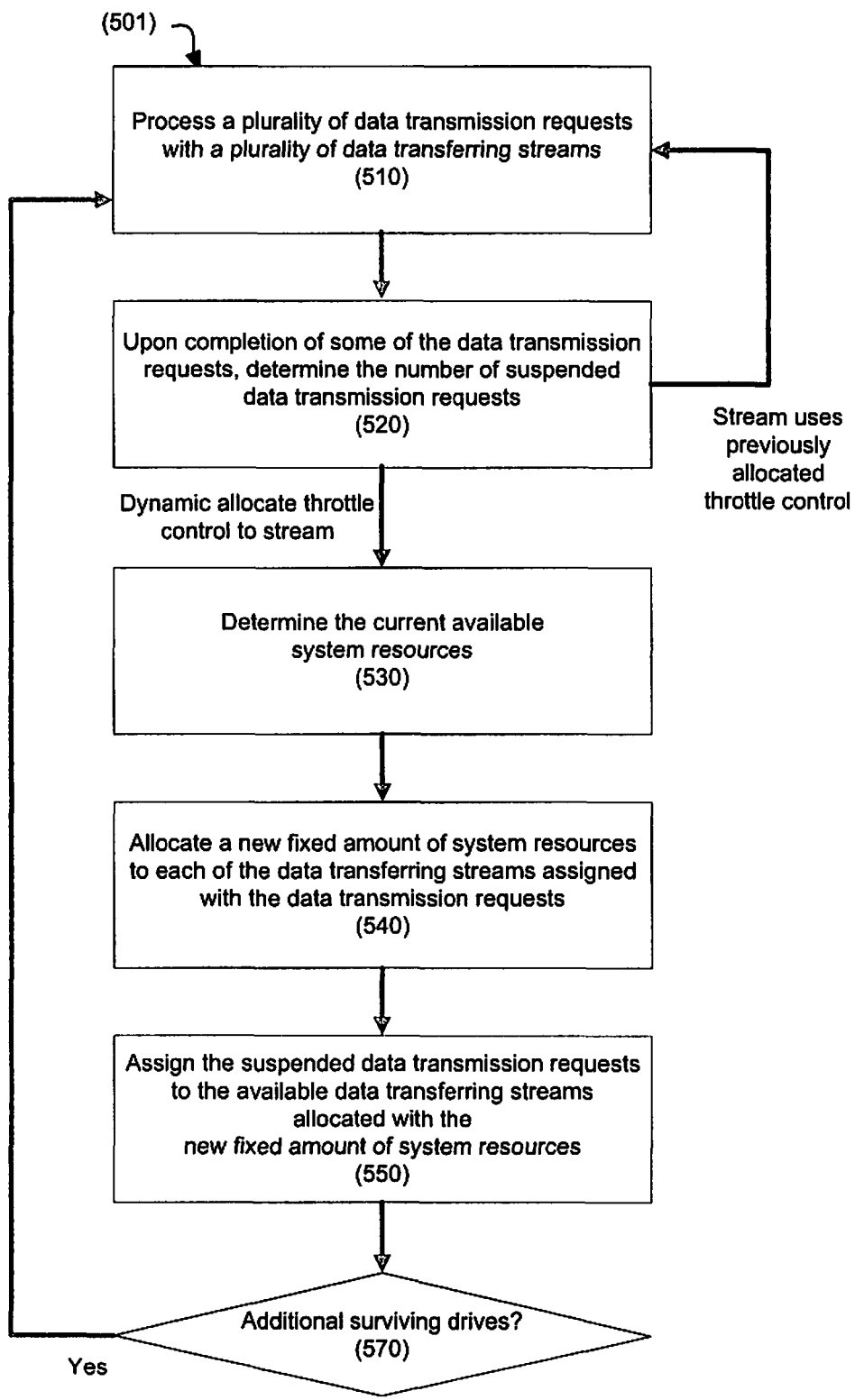
FIG. 5 illustrates a process for dynamic throttle control during simultaneous data transferring.

In one embodiment, the system resources allocated to the streams are also determined based on the number of data transferring requests received. Thus, if the number of data transferring requests exceeds the number of streams, then all streams can be utilized, and each stream is allocated with its fixed amount of system resources. FIG. 5 further describes resource allocation in situation when the number of data transferring requests is less than the available streams. The number of simultaneous processes determined at 420, and the amount of system resources allocated to each of the simultaneous processes at 430, are closely related. The more simultaneous processes there are, the less system resources each process can receive. Thus, factors such as the types of service the storage system is design for, the number of simultaneous processes, and/or the system resources required by the different types of services, etc, can be taken into consideration in determining an optimal resource control configuration.

In one embodiment, the throttle control configured at 430 can be implemented at a primary storage system, a secondary storage system, a client, or a combination thereof. Regardless of where the resource control is implemented, multiple data transfers need to satisfy all resource control requirements before they can be simultaneously accomplished. For example, if a primary storage system contains a resource control system which allows five streams, and a secondary storage system contains a separate resource control system which allows three streams, then only three of the data transfers can satisfy both resource control system's requirements, and are therefore allowed to transfer data between these two storage systems. Additional data transfers, even though they might be granted execution in the primary storage system, cannot proceed in the secondary storage system if there are not streams available at the secondary storage system for receiving data.

At 440, once the throttle control is in place, the resource control system assigns the available streams to the pending data transferring requests, until there are no more streams for assignment. The requests that received stream assignments are allowed to start transferring data via the streams, and each transfer is not allowed to utilize more system resources than the amount allocated to the transfer's associated stream. Restricting utilization of system resources can be accomplished either by using external mechanisms provided by operating system, or by invoking the internal control within the processing streams. For example, some UNIX operating systems allow assigning storage usage quotas to specific user accounts. The throttle control can invoke such mechanism and set the specific quotas based on the assigned amount of resources. During execution, if a process initiated by a specific user requests for additional storage resource that exceeds the user's assigned quota, the operating system can enforce the quota in resource allocation and reject the resource request. Alternatively, the throttle control may add internal resource allocation codes to the streams, so that the stream could stop acquiring system resources once the amount of obtained resources reaches the assigned throttle number.

At 450, if there are no more streams available for simultaneous transferring, and additional data transferring requests are received, the throttle control can suspend the additional requests until some of the streams complete their transferring, and/or additional system resources become available. Similar to resource assignment at 440, suspending a data request can be accomplished with operating system mechanisms or customized controls. For example, a UNIX operating system provides system calls (similar to a CTRL-Z instruction) to suspend a process. The suspended process can be later reactivated through a separate UNIX mechanism. Also, WINDOWS® operating system includes API functions similar to a "SuspendThread" call for the suspending purposes. The suspended tasks can be later reactivated with a WINDOWS "ResumeThread" or similar functions.

At 460, one or more processing streams complete their transferring tasks. And these streams, as well as the system resources allocated to them, become available. Thus, the data processing requests suspended at 450 can be activated and assigned with these available streams for their turns of processing. If the number of suspended requests exceeds the number of newly available streams, then only a subset of suspended requests equaling to the number of newly available streams is reactivated, and the rest of requests remain suspended. FIG. 5 further describes the scenarios when the suspended requests is less in number than the number of available streams.

FIG. 5 illustrates a process 501 for limiting simultaneous data transfers and throttle control, according to certain embodiments of the present invention. The process 501 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 401 can be stored in memory 220 of FIG. 2, executed by the processor 210 of FIG. 2, and/or implemented in a data protection server 130 of FIG. 1. The process 401 can also operate logically between a file system manager and a storage driver layer in the storage servers 140 and 150 of FIG. 1, as described above.

At 510, a fixed number of initialized streams are utilized to process multiple data transmission requests. Each of the fixed number of streams is allocated with a fixed amount of system resources. At 520, once some of the processing data transfers complete their tasks, their associated streams are released, and the system resources assigned to these streams become available. Thus, process 501 determines at 520 whether there are previously suspended data transferring requests waiting for the transferring, and how many of these suspended requests there are. In one embodiment, the suspended data requests are activated and assigned to the available streams. The data requests continue to use the throttle number previously allocated to the available streams, regardless of whether there are more or less streams available for the data requests. Thus, process 501 returns to 510 for further processing, even though there might be additional system resources available. Such approach simplifies the assignment of resources, and is valuable for a storage server with predictable and nonvolatile loads.

In one embodiment, the process 501 dynamically allocated the current available system resources to process the pending data transferring requests. The process 501 goes to 530 to determine the current available system resources, which may or may not be the same as the total resources released by the idling streams. For example, ad hoc processes can be initiated or terminated along with the data transferring processes, which can increase or decrease the amount of available system resources. At 540, newly determined available system resources are allocated or distributed to each of the streams assigned with data transferring requests. For example, assuming a system has ten (10) simultaneous streams initiated, each of which is initially allocated with 100 kbps of network resources. When eight (8) of the simultaneous transfers finish at around the same time, the unused throttle that becomes available is (8*100 kbps) 800 kbps. If there are five (5) suspended transfers yet to be started, then each of the five transfers can be assigned with a throttle of (800 kbps/5) 160 kbps, which is significantly higher than the original throttle of 100 kbps initially assigned to each of the streams. Thus, when there are more idling streams than the data transferring requests, system resources can be dynamically and more efficiently allocated based on process needs.

At 550, the suspended data requests are then assigned to the data transferring streams which have been dynamically allocated with the new throttle number. In the above example, even though there are seven (two previously unfinished transfers and five newly activated ones) streams simultaneously running, all available system resources are fully utilized, and the throttle control are not the same for these seven streams. Alternatively, there might be situations in which newer data transferring requests are received, and based on an evaluation of available system resource at 530, the newer data requests may have less or no resources available for processing, even though there are idling streams available for assignment. Therefore, process 501 is a throttle control scheme that focuses more on optimal utilization of system resources, and less on the number of simultaneous processes that can be initiated. Such approach is advantageous, especially for data replication transfers, since the more resources are allocated to each transfer, the quicker the transfer can be accomplished, which in turn lowers the risk of potential data loss due to disastrous situations.

In one embodiment, resource control can be dynamically configured based on system demands during run-time. For example, the number of data transferring streams can be dynamically increased or decreased. The throttle control can be manually or automatically determined and applied, and the behavior of the system resource reassignment, such as whether to continuously use the previously assigned throttles, or to dynamically determine new throttles based on system loads, can also be configured.

Thus, methods and systems for limiting simultaneous data transfers and efficient throttle management have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable storage medium", as the term is used herein, includes any mechanism that stores information in a form accessible by a machine (e.g., a computer, network device, personal digital assistant (PDA), manufacturing tool, any device with a set of one or more processors, etc.). For example, a machine-accessible storage medium include recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
setting a limit, in a computer system that includes a processor and a memory, for a number of processes that can be simultaneously executed in the computer system; and
simultaneously executing a plurality of processes in the computer system so that each of the processes is subject to a throttle control, wherein the number of the plurality of processes that are simultaneously executing does not exceed the limit, wherein the throttle control limits an amount of system resources that can be allocated to each of the plurality of processes, such that a total amount of system resources allocated to the plurality of processes does not exceed available system resources in the computer system.

2. The method as recited in claim 1, further comprising:
suspending execution of additional processes in the computer system, upon a determination that a number of processes simultaneously executing in the computer system has reached the limit.

3. The method as recited in claim 2, further comprising:
upon completion of one of the plurality of processes, executing a suspended process in the computer system using resources previously allocated to said one of the plurality of processes.

4. The method as recited in claim 1, further comprising:
suspending execution of additional processes in the computer system, upon a determination that there is no available system resources in the computer system.

5. The method as recited in claim 1, further comprising:
upon initiating additional simultaneous processes, implementing a new throttle control on each of the additional simultaneous processes based on newly available system resources in the computer system.

6. The method as recited in claim 1, wherein the system resources include at least one of CPU, network, memory, or storage resources, the network resource includes network bandwidth that can be utilized by the computer system.

7. A method comprising:
configuring a primary storage system and a secondary storage system, wherein the primary storage system performs data replication transfers to the secondary storage system;
setting a limit for a number of data transfers that can be simultaneously performed in the primary storage system;
implementing a throttle control on each of a plurality of data replication transfers, wherein a number of the plurality of data replication transfers does not exceed the limit, and the throttle control limits an amount of system resources that can be allocated to each of the plurality of data replication transfers; and
simultaneously executing the plurality of data replication transfers, such that a total amount of system resources allocated to the plurality of data replication transfers equals a previously determined amount of available system resources in the primary storage system.

8. The method as recited in claim 7, further comprising:
suspending further data replication transfers when the limit is reached for simultaneous data replication transferring.

9. The method as recited in claim 8, further comprising:
upon completion of a data replication transfer, activating one of the suspended data replication transfers.

10. The method as recited in claim 7, further comprising:
allocating a new throttle control to additional data replication transfers, wherein the new throttle control is determined based on current available system resources in the primary storage system.

11. The method as recited in claim 7, further comprising:
setting a second limit for a second number of data transfers that can be simultaneously received at the secondary storage system, wherein the number of the plurality of data replication transfers does not exceed the second limit.

12. The method as recited in claim 7, wherein the data replication transfers include backup, mirroring, or restoring of data between the primary storage system and the secondary storage system.

13. The method as recited in claim 7, wherein the data replication transfers transfer data stored in a storage server, a volume, or a qtree of the primary storage system.

14. A network storage system comprising:
a resource control module to:
set a limit for a number of data transfers that can be simultaneously performed in the network storage system; and
implement a throttle control on each of a plurality of data replication transfers, wherein a number of the plurality of data replication transfers does not exceed the limit, and the throttle control limits an amount of system resources that can be allocated to each of the plurality of data replication transfers;
a data protection module coupled with the resource control module to simultaneously execute the plurality of data replication transfers between the network storage system and a second network storage system, such that a total amount of system resources allocated to the plurality of data replication transfers equals a previously determined amount of available system resources in the network storage system;

a processor; and a memory coupled with the processor, the memory storing instructions for the resource control module and the data protection module, which, when executed by the processor, cause the system to perform the instructions.

15. The system as recited in claim 14, wherein the data protection module suspends execution of additional processes in the network storage system, upon a determination that a number of processes simultaneously executing in the network storage system has reached the limit.

16. The system as recited in claim 15, wherein, upon completion of one of the plurality of processes, the data protection module executes a suspended process in the network storage system using resources previously allocated to said one of the plurality of processes.

17. The system as recited in claim 14, further comprising:

a network adapter coupled with the processor, through which to communicate a data access request with a second system over a network.

18. The system as recited in claim 17, further comprising:

a storage adapter coupled with the processor, through which to access data stored in a mass storage facility in response to the data access request.

19. A method comprising:

receiving a plurality of data transmission requests at a network storage system;

assigning a pre-determined number of data transfer processes to process the plurality of data transmission requests, wherein any one of the plurality of data transmission requests that is not assigned to one of the data transfer processes is suspended;

allocating a fixed amount of system resources to each of the data transfer processes, wherein a total amount of system resources allocated to the data transferring processes does not exceed available system resources in the network storage system; and simultaneously executing the pre-determined number of data transfer processes to process members of the plurality of data transmission requests that are assigned to the data transfer processes.

20. The method as recited in claim 19, further comprising:

upon completion of processing by one of the data transferring processes, assigning the data transferring process to process one of the plurality of data transmission requests that is suspended.

21. The method as recited in claim 19, further comprising:

upon completion of execution by one of the data transferring processes, releasing the fixed amount of system resources allocated to the data transferring process.

22. The method as recited in claim 19, further comprising:

upon receiving an additional data transmission request, determining current available system resources in the network storage system;

assigning an idle data transferring process selected from the pre-determined number of data transferring processes to process the additional data transmission request; and allocating a new fixed amount of system resources to the idle data transferring process, wherein a total amount of system resources allocated to the data transferring processes does not exceed available system resources in the network storage system.

23. The method as recited in claim 19, wherein the pre-determined number of data transferring processes is reused for processing additional data transmission requests.

24. The method as recited in claim 19, wherein the system resources include network bandwidth that can be utilized by the network storage system.

25. The method as recited in claim 19, wherein the method is embodied in a machine-readable storage medium as a set of instructions which, when executed by a processor, cause the processor to perform the method.

* * * * *